United States Patent [19]

Benson et al.

[11] Patent Number: 4,920,305

[45] Date of Patent: Apr. 24, 1990

[54] AUTO CALIBRATING ELECTRO HYDRAULIC SERVO DRIVER

[75] Inventors: Richard E. Benson, Mentor, Ohio; Andrew D. Gavrilos, New Kensington, Pa.; Robert S. Rand, Painesville, Ohio; Scott M. Shaw, Allison Park, Pa.; Joel W. Spafford, Cleveland, Ohio; Ronald J. Walko, Ford City, Pa.

[73] Assignee: The Babcock & Wilcox Company, New Orleans, La.

[21] Appl. No.: 308,989

[22] Filed: Feb. 8, 1989

Related U.S. Application Data

[63] Continuation of Ser. No. 62,279, Jun. 12, 1987, abandoned.

[51] Int. Cl.⁵ .............................................. G05B 3/20
[52] U.S. Cl. .................................................. 318/657
[58] Field of Search .................. 318/657; 364/571.01, 364/571.02, 571.04, 571.05, 571.06, 571.07, 582

[56] References Cited

U.S. PATENT DOCUMENTS

| | | | |
|---|---|---|---|
| 2,557,224 | 6/1951 | Hornfeck | 318/657 X |
| 2,708,730 | 5/1955 | Alexander et al. | 318/657 |
| 2,899,615 | 8/1959 | Williams, III | 318/657 X |
| 4,089,494 | 5/1978 | Anderson et al. | 318/628 X |
| 4,456,863 | 6/1984 | Matusek | 318/625 X |
| 4,542,638 | 9/1985 | Tlaker | 364/571 X |
| 4,628,499 | 12/1986 | Hammett | 364/167 |
| 4,678,991 | 7/1987 | Schmidt | 318/657 X |
| 4,730,264 | 3/1988 | Kohler | 364/571.02 |

FOREIGN PATENT DOCUMENTS

| | | | |
|---|---|---|---|
| 0864241 | 9/1981 | U.S.S.R. | 318/656 |
| 2088087 | 6/1982 | United Kingdom | 318/567 |

Primary Examiner—Bentsu Ro
Attorney, Agent, or Firm—Vytas R. Matas; Robert J. Edwards

[57] ABSTRACT

An electro-hydraulic positioning system which has automatic calibration capabilities is disclosed. The system includes a microprocessor which accesses calibration parameters stored in a non-volatile memory unit. The microprocessor adjusts the position demand according to the stored calibration parameters. The system may be placed in an atuomatic calibration mode. In which case, update calibration parameters are automatically determined and stored. The system also includes a microcontroller which monitors system operating variables and reports deviations of the variables from expected values for same.

3 Claims, 2 Drawing Sheets

AUTO CALIBRATING ELECTRO HYDRAULIC SERVO DRIVER

This is a continuation of application Ser. No. 07/062,279 filed June 12, 1987, now abandoned.

TECHNICAL FIELD

The present invention relates generally to apparatus for determining the position of a driven servo device and more particularly to an electro-hydraulic positioning system which can be automatically calibrated through the use of calibration parameters stored within an associated memory apparatus.

BACKGROUND ART

Electro-hydraulic systems are used extensively for the positioning of control valves or other servo devices requiring high thrust and rapid, accurate positioning. Such systems must be calibrated periodically to ensure the proper operation thereof and the accurate positioning of the controlled device. Typically, to achieve satisfactory system calibration, the controlled device must be manually positioned to predetermined positions while various control circuit parameters are manually adjusted. Since the control circuitry is usually remotely located relative to the controlled device, several persons and a communication network are required to complete the calibration process. In addition, in some instance the calibration adjustments are interdependent resulting in a time consuming, iterative calibration process. And lastly, the resulting potentiometer settings, etc., resulting from the calibration process are subject to shifting due to vibration, contact creep, potentiometer aging, etc., all of which can result in inaccurate positioning of the controlled device.

Because of the foregoing, it has become desirable to develop an electro-hydraulic positioning system which can be automatically calibrated.

SUMMARY OF THE INVENTION

The present invention solves the problems associated with the prior art and other problems by providing a microprocessor which controls the flow of data to and from non-volatile memory apparatus within the electro-hydraulic positioning system. The memory apparatus, in the form of a known integrated circuit semiconductive chip, is utilized for storing calibration parameters which are determined when the system is placed within a calibration mode of operation. The microprocessor controls the overall system operation by adjusting the position demand of the servo driven device according to the calibration parameters stored in the memory apparatus to arrive at a new position demand for the servo driven device. In addition, monitoring of system variables and reporting of deviations from expected values, including fault conditions, for same are readily accomplished through the use of a microcontroller. The microcontroller reports the condition of the system variables to the microprocessor.

DESCRIPTION OF THE PREFERRED EMBODIMENT

Figure 1:
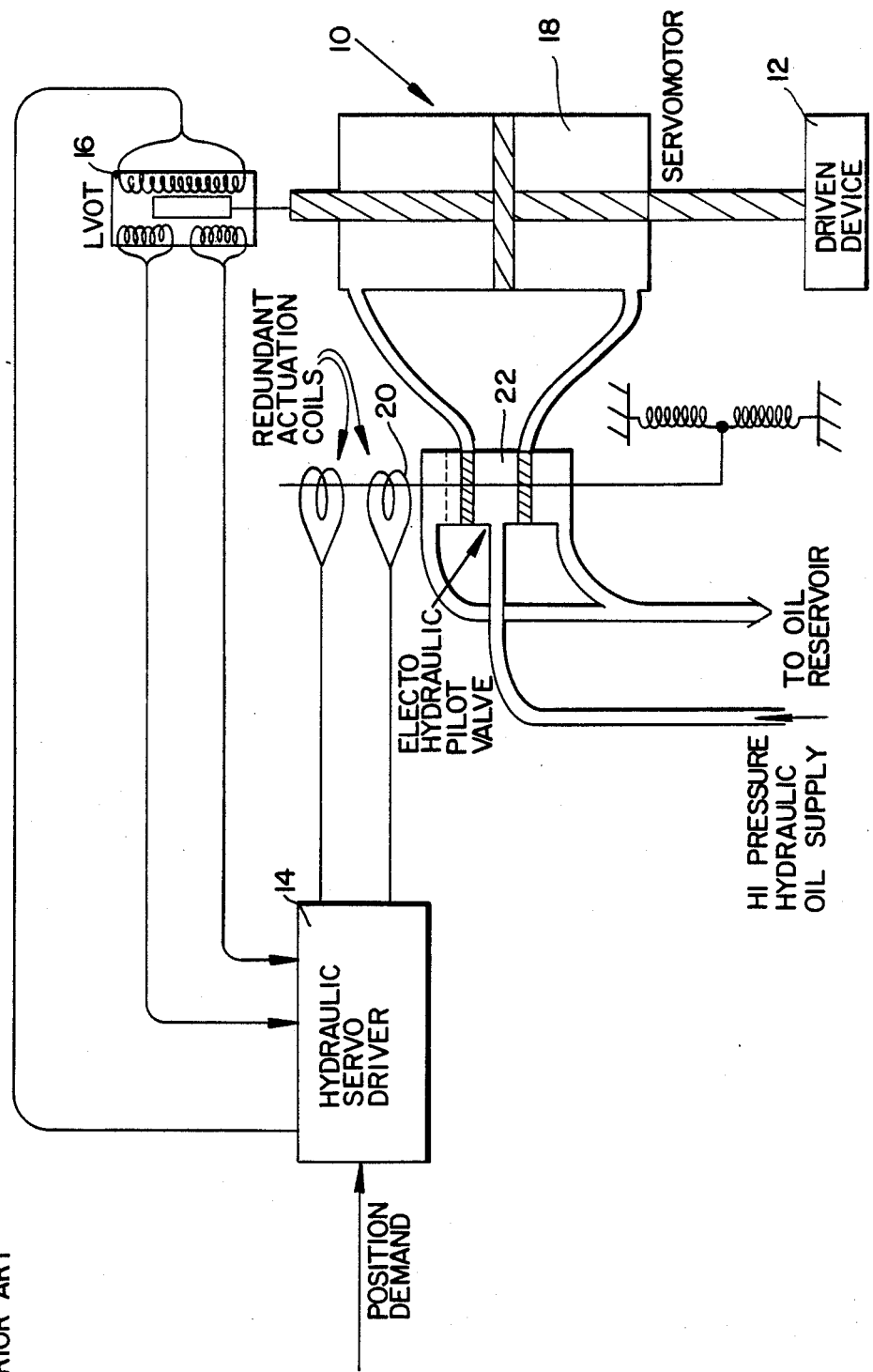
FIG. 1 is a schematic drawing of a prior art electro-hydraulic system for positioning a driven servo device.

Referring now to the drawings where the illustrations are for the purpose of describing the preferred embodiment of the present invention and are not intended to limit the invention hereto, FIG. 1 is a schematic drawing of a prior art electro-hydraulic system 10 for positioning a servo driven device 12, such as a steam turbine control valve or another device requiring high thrust and the rapid, accurate positioning thereof. The system 10 includes a hydraulic servo driver 14 which receives a signal representative of position demand from an operator request or from another control device (not shown). The hydraulic servo driver 14 provides the excitation voltage for a linear voltage differential transformer 16 which is operatively connected to the servo driven device 12 by means of a servo motor (piston) 18 connected therebetween. The outputs of the linear voltage differential transformer 16 are connected to the inputs to the hydraulic servo driver 14 permitting the servo driver 14 to compare the position demand with the actual position of the servo driven device 12 and to produce an output signal when a difference in position exists therebetween. When such a difference in position exists, the output signal produced by the hydraulic servo driver 14 is applied to a pair of coils 20 associated with an electro-hydraulic pilot valve 22 which regulates the flow of high pressure hydraulic oil to the servo motor 18. Actuation of the coils 20 causes the pilot valve 22 to shift from its neutral position allowing the high pressure hydraulic oil to flow from an oil supply (not shown) through the pilot valve 22 into one end of the servo motor 18 and oil to drain from the other end of the servo motor 18 through the pilot valve 22 to an oil reservoir (not shown). The foregoing hydraulic oil flow causes the piston of the servo motor 18 to move in a direction to reduce the difference between the position demand and the actual position of the servo driven device 12. As the difference between the position demand and the actual position of the servo driven device 12 decreases, the hydraulic servo driver 14 reduces the current flow to the coils 20 associated with the electro-hydraulic pilot valve 22. When the difference between the position demand and the actual position of the servo driven device 12 becomes zero, the electro-hydraulic pilot valve 22 returns to its neutral position terminating further hydraulic flow to or from the servo motor 18 and locking the servo driven device 12 at the corrent position.

The foregoing prior art system 10 typically utilizes conventional analog circuitry to control the electro-hydraulic pilot valve 22. Such circuitry contains numerous jumpers and potentiometers which are used to calibrate the position feedback signal produced by the linear voltage differential transformer 16. To achieve satisfactory system calibration requires the servo driven device 12 to be manually positioned to predetermined positions while the circuit parameters are adjusted. Since the circuitry is typically mounted away from the servo driven device and the control room, the calibration process usually requires three or more people working together through a communication network. In many instances the calibration adjustments are interdependent requiring an iterative, calibration process that is very time consuming. In addition, the resulting potentiometer settings are subject to shifting due to vibration, contact creep, potentiometer aging, etc.

Figure 2:
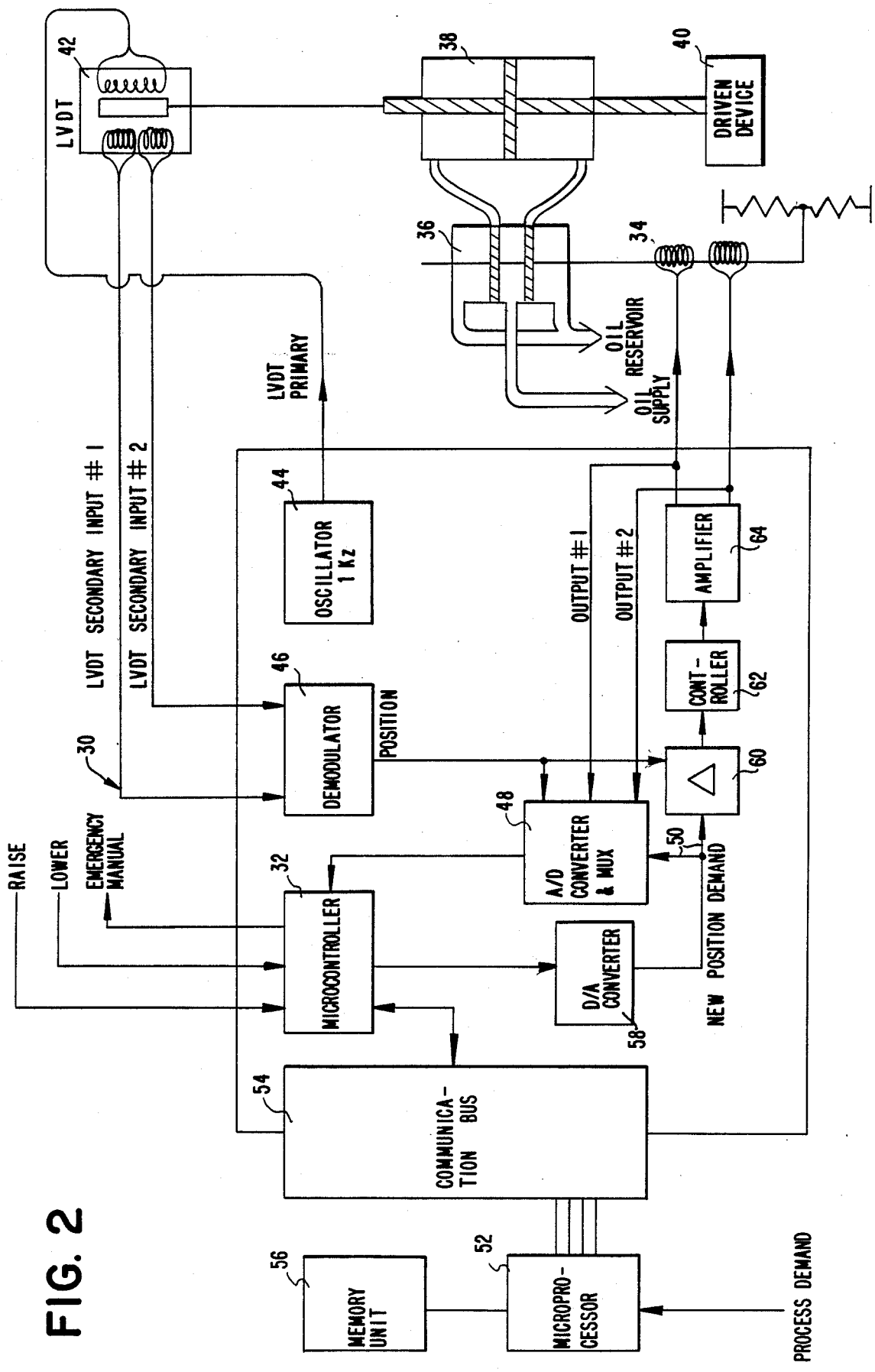
FIG. 2 is a schematic drawing of the electro-hydraulic positioning system of the present invention.

The present invention is shown in FIG. 2 which is a schematic drawing of an electro-hydraulic positioning system 30 which utilizes a microcontroller 32 to control the actuation of the coils 34 associated with an electro-hydraulic pilot valve 36 which, in turn, controls the flow of hydraulic oil to a hydraulic servo driver 38 connected to a servo driven device 40. The microcontroller 32 is a known digital integrated circuit chip made up of semiconductor circuitry comprising a Central Processing Unit (CPU), Read Only Memory (ROM), and Random Access Memory (RAM). The chip is used to execute a self contained computer program that performs a small set of specific tasks. The actual position of the servo driven device 40 is determined by a linear voltage differential transformer 42 which receives its excitation voltage from an oscillator 44. The output of the linear voltage differential transformer 42 is connected to the inputs of a demodulator 46 which produces a signal representative of the actual position of the servo driven device 40. This signal representative of the actual position of the servo driven device 40 is applied to an input of a multiplexer and analog to digital converter 48. Signals representative of position demand from along line 50 and current through the coils 34 are also applied to the multiplexer and analog to digital converter 48. The multiplexer and A/D converter 48 converts these three analog signals to digital signals which are applied to the microcontroller 32. The microcontroller 32 monitors the signals representative of the actual position of the servo driven device 40 and the current through the coils 34 and reports deviations from expected values for same to a microprocessor 52 over a parallel communication bus 54. The microprocessor 52 is a known digital integrated circuit chip made up of semiconductor circuitry comprising a central processing unit. The microprocessor 52 is a general purpose computing device which can be used to perform a wide variety of tasks. In the present invention, the microprocessor 52 receives the signals for present position demand from known external circuitry controlling the overall process and calculates a new position demand utilizing previously obtained calibration parameters stored in a non-volatile memory unit 56. The microprocessor 52 then transmits a signal representative of new position demand to the microcontroller 32 over communication bus 54. It should be noted that the automatic operation of the microprocessor 52 will be overridden if the microcontroller 32 does not receive the new position demand from the microprocessor 52 over communication bus 54 within a preset time. The microcontroller 32 then reverts to and indicates an emergency manual mode wherein the servo driven device 40 can be manually controlled by actuation of the raise and lower and manual inputs to the microcontroller 32. In any event, a digital to analog converter 58 converts the signal representative of new position demand to an analog signal which is applied to a difference unit 60 along with a signal indicative of the actual position of the servo driven device 40 from demodulator 46. The difference unit 60 determines the difference between the actual position of servo driven device 40 and the new position demand and sends a correction signal to eliminate this difference to a controller 62. The controller output is in turn amplified by an amplifier 64 and the output of amplifier 64 is applied to the coils 34 associated with the electro-hydraulic pilot valve 36.

One of the functions of the microcontroller 32 is to perform a system calibration cycle when required. Such a calibration cycle would include the following steps:
 (a) Ramping the servo driven device to its 100% mechanical position limit;
 (b) Storing the measured position so determined as $P_{100}$ in the microcontroller 32 and sending the measured position $P_{100}$ over communication bus 54 to microprocessor 52 which in turn stores the position in non-volatile memory unit 56;
 (c) Ramping the servo driven device to its 0% mechanical position limit;
 (d) Storing the measured position so determined as $P_0$ in the microcontroller 32 and sending the measured position $P_0$ over communication bus 54 to microprocessor 52 which in turn stores the position in non-volatile unit 56.
 (e) Ramping the servo driven device back to its original position demand.

With the calibration constants $P_0$ and $P_{100}$ so stored within the non-volatile memory unit 56, the actual position demand for the servo driven device 40 can be determined by the microprocessor 52 from the following relationship:

$$\text{New Position Demand} = \frac{(\% \text{ position demand})(P_{100} - P_0) + P_0}{100}$$

Thus, calibration can be easily effected, and once effected, can be utilized to control the position of the servo driven device to produce the desired demand.

The foregoing apparatus and method for system calibration and operation provides numerous advantages over the prior art systems. The present invention permits automatic system calibration and greatly reduces the time and manpower required for same. Since calibration time is significantly reduced, the servo driven device is out of service for a much shorter period of time than when calibration of a prior art system is being undertaken. In addition, calibration of the present invention does not require any test equipment, thus, eliminating the expense associated with same and any errors which can be introduced by same. Since the calibration parameters are determined and stored in non-volatile memory unit 56, the hydraulic servo driver 38 can be readily replaced, if required, and the calibration parameters can be down loaded such that a calibration cycle is not required for the new device. This advantage applies to any element of the system which may malfunction and need replacement and is not limited to the hydraulic servo driver 38. By storing the calibration parameters in the non-volatile memory unit 56, errors due to vibration, contact creep, and potentiometer aging are eliminated, and calibration shifts resulting from unauthorized tampering can be detected and corrected. And lastly, the use of the microcontroller 32 provides for automatic system fault detection, i.e., the microcontroller 32 monitors signals indicative of actual position of the driven servo device, the position demand, and the current through the actuation coils 34 associated with the electro-hydraulic pilot valve 36, and reports when these variables exceed certain limits.

Certain modifications and improvements will occur to those skilled in the art upon reading the foregoing. It should be understood that all such modifications and improvements have been deleted herein for the sake of conciseness and readability but are properly within the scope of the following claims.

We claim:

1. An electro-hydraulic servo system having automatic calibration capabilities and having the ability to move a driven device toward a desired position for the driven device comprising:

means for determining % position demand of the driven device;

microcontroller 32 for actuating the driven device through an automatic calibration sequence by ramping the driven device to its 100% mechanical limit $P_{100}$ and it 0% mechanical limit $P_0$ to obtain calibration data for the driven device, a microprocessor connected responsive to said calibration data from said microcontroller; and non-volitile memory means 56 connected to said microprocessor for storing said calibration data received by said microprocessor, said microprocessor accessing said calibration data from said memory means and calculating the desired position of the driven device from said calibration data and said % position demand according to the following equation:

$$\text{[New Position Demand]} = \text{Desired Position} = \frac{(\% \text{ position demand}) (P_{100} - P_0) + P_0}{100}.$$

2. The system as defined in claim 1, wherein said microcontroller includes override means for switching to manual if a control signal is not received from said microprocessor within a predetermined time.

3. A method of performing an automatic self-calibration cycle on a servo driven device using a microcontroller connected to a microprocessor which is in turn connected to a non-volatile memory unit comprising the steps of:

ramping the servo driven device from its original position to 100% of its mechanical position limit in response to a signal from the microcontroller;

storing the 100% position as $P_{100}$ signal to the microprocessor which in turn stores the $P_{100}$ signal in the non-volatile memory unit;

ramping the servo driven device from its 100% mechanical position limit to its 0% mechanical position limit in response to another signal from the microcontroller;

storing the 0% position as $P_0$ in the microcontroller and sending the $P_0$ signal to the microprocessor which in turn stores the $P_0$ signal in the non-volatile memory units;

ramping the servo driven device back to its original position; and determining a new position demand for the servo driven device by the microprocessor using the $P_{100}$ and $P_0$ signals in the non-volatile memory unit and a % position demand, according to the following relationship:

$$\text{[New Position Demand]} = \text{Desired Position} = \frac{(\% \text{ Position Demand}) (P_{100} - P_0) + P_0}{100}.$$

* * * * *